United States Patent [19]

Vragov et al.

[11] 3,828,647
[45] Aug. 13, 1974

[54] METHOD OF MILLING WORKPIECES

[76] Inventors: Jury Dmitrievich Vragov, prospekt Lenina, 26, kv. 51; Vladimir Egorovich Danyaev, ulitsa Pisareva, 10, kv. 1; Anatoly Petrovich Trubin, ulitsa Lyadova, 31b, kv. 1; Sergei Gavrilovich Sinichkin, ulitsa Krasnoflotskaya 8, kv. 3, all of Gorky, U.S.S.R.

[22] Filed: Sept. 27, 1972

[21] Appl. No.: 292,836

[52] U.S. Cl................... 90/11 C, 33/23 H, 83/410, 90/13.2, 90/62 R, 144/145 A
[51] Int. Cl.............................................. B23q 33/00
[58] Field of Search........ 90/13.4, 11 C, 62 R, 13.3, 90/13.2; 144/134 A, 145 A; 219/69 G, 125 PL; 33/174 P, 23 H, 27 K, 23 K; 83/410, 565

[56] References Cited
UNITED STATES PATENTS

| | | | |
|---|---|---|---|
| 2,141,631 | 12/1938 | Whitney et al. | 144/145 A |
| 2,752,690 | 7/1956 | Heath et al. | 33/174 P |
| 2,828,673 | 4/1958 | Campbell | 90/62 R X |
| R25,542 | 3/1964 | Webb | 219/69 G X |

*Primary Examiner*—Andrew R. Juhasz
*Assistant Examiner*—Z. R. Bilinsky
*Attorney, Agent, or Firm*—Holman & Stern

[57] ABSTRACT

A pattern made from a conductive material is bound with a workpiece to be machined. The pattern is electrically insulated from the latter and placed on the table of a machine-tool. The pattern and a cutter disposed in proximity thereto are so connected to a machine control circuit that an electric discharge is produced therebetween. Parameters of the electric discharge determined by the value of a clearance between the cutter and the pattern are used as control signals for the control system of the machine. The control system provides the travel of the cutter along the pattern contour. At the same time the workpiece is machined by the cutter according to a predetermined outline.

3 Claims, 3 Drawing Figures

PATENTED AUG 13 1974 3,828,647

METHOD OF MILLING WORKPIECES

BACKGROUND AND SUMMARY OF THE INVENTION

The present invention relates to the machining of work-pieces, and more particularly, to the milling of workpieces to patterns.

The invention is usable in the two-dimensional milling on dublicating milling machines provided with electrodischarge sensors for machining such pieces as cams, master forms, cranks and the like.

Known in the art is a method of milling workpieces to patterns on duplicating milling machines provided with electrodischarge sensors.

This method is employed, for example, on some machines manufactured by Pratt & Whitney (USA), on the "Rigid Contouria" machine of the "Starrfraesmaschinen" (Switzerland) and the "FQC-25" machine manufactured by the Works after "May 1" (Poland).

According to this method, the pattern is manufactured from conductive materials, for example, a metal, or in the form of a drawing applied with a conductive composition to an insulating base. The pattern and the tracer of the electrodischarge duplicating instrument are connected to a high-voltage output (usually 1,000–2,000v) of the duplicating control circuit in such a manner that as they approach each other (within about 0.15–0.3 mm) an electric discharge is produced therebetween. The parameters of the discharge, i.e., voltage and current depend on the discharge value and they are used as signals for controlling the travel of the machine actuating members.

The travel of these members is accomplished in such a manner that the tracer follows the pattern outline without touching the latter, while an electric discharge is maintained therebetween. Due to this movement, the cutter will machine the workpiece by cutting thereon a contour identical to that of the pattern.

There is also known a method of milling workpieces to patterns characterized in that the pattern is positioned with respect to the workpiece in such a manner that the contour projection of the pattern being duplicated on a profiling plane is equidistant to the contour to be machined by a cutter on this workpiece. In the specific case in which the tracer and the cutter are equal in diameter, this projection coincides with the contour being machined. The workpiece and the pattern are rigidly bound, while the tracer and the cutter are positioned coaxially.

The disadvantage of the above methods resides in the need for changing and readjusting the tracer with changes in the diameter of the cutter, for example, due to its resharpening. In order to provide the required machining accuracy, the diameter of the tracer should correspond to that of the cutter, i.e., both diameters should be equal or differ from one another by a certain value. In setting a new cutter, its diameter is measured and a new tracer of a corresponding diameter is installed.

The need for these auxiliary operations reduces the efficiency of a machine in processing workpieces and brings about the necessity for providing a set of changeable tracers.

An object of the present invention is to increase the efficiency of machines in processing workpieces.

This and other objects are accomplished in that, in a method of milling workpieces to patterns consisting in that a workpiece and a pattern made of a conductive material are rigidly bound and placed in such a manner that the contour projection of the pattern being duplicated on a profiling plane is equidistant from the contour to be machined by a cutter on this workpiece, the tracer is positioned close to the pattern with provision for an electric discharge therebetween, with the result that the tracer follows the entire contour of the pattern, while an electric discharge is maintained between them. Depending on the value of the electric discharge, the cutter and the workpiece are displaced relative to each other to obtain the required contour on the workpiece and according to the present invention, the cutter itself is used as a tracer, the cutting surface of said cutter being positioned close to the pattern for providing an electric discharge therebetween, the pattern being electrically insulated from the workpiece.

The present invention makes it possible to eliminate the necessity of changing the tracer with a change of the cutter diameter, since the change of a cutter is actually the change of the tracer. This provides an increase of the machine efficiency in machining workpieces.

Also, the construction of the machine-tool is simplified due to the elimination of the duplicating instrument. Thus, the need of having sets of changeable tracers is eliminated.

BRIEF DESCRIPTION OF THE DRAWINGS

Other objects and advantages will be apparant from the following detailed description of preferred embodiments of the invention taken in conjunction with the accompanying drawings, wherein.

DESCRIPTION OF THE PREFERRED EMBODIMENTS

A pattern 1 (FIGS. 1 and 2) made from a conductive material is rigidly bound with a workpiece 2 being machined (connection elements are not shown). The workpiece 2 and the pattern 1 are fixed on the table of a duplicating machine-tool (not shown).

A cutter 3 is set close to the pattern 1. The pattern 1 and the cutter 3 are connected to the high-voltage output of a duplicating control circuit.

The pattern 1 has such dimensions and is so mounted relatively to the workpiece 2 that the projection of its contour being duplicated on a profiling plane is equidistant to the contour which should be machined on the workpiece 2.

Figure 1:
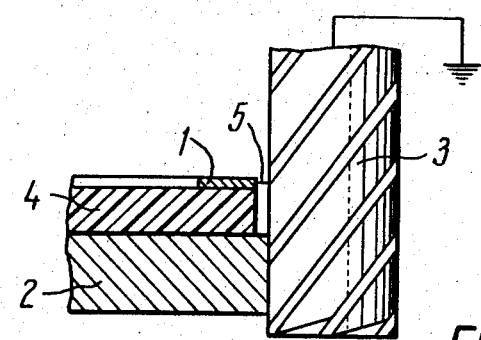
FIG. 1 is a sectional view in elevation illustrating the method of milling a workpiece from a conductive material according to the present invention.

If the workpiece 2 is made from a conductive material, it should be insulated from the pattern 1 with a gasket 4, as shown in FIG. 1.

Figure 2:
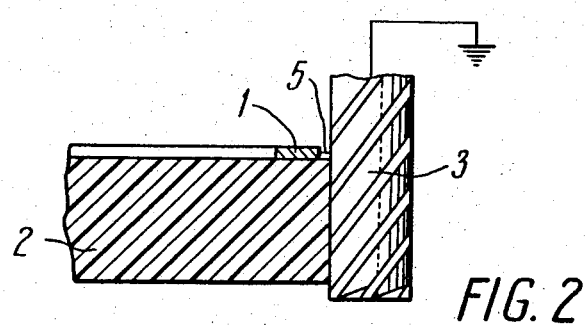
FIG. 2 is an elevational sectional view illustrating the milling of a workpiece from a nonconductive material.
Figure 3:
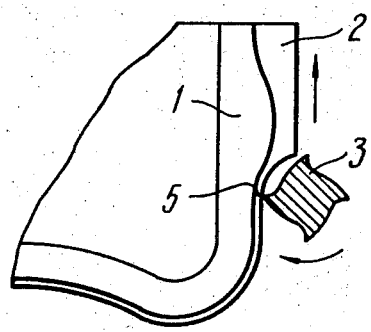
FIG. 3 is a top view of both diagrams.

If the workpiece 2 is made from a non-conductive material there is no need for the gasket. In this case the workpiece 2 itself functions as a gasket as shown in FIG. 2.

The duplicating control circuit includes an electrodischarge sensor (no shown) whose cutter 3 operates as a tracer.

The milling process in accordance with this invention is accomplished as follows:

As a high voltage is applied to the duplicating control circuit, in the clearance between the contour of the pattern 1 being duplicated and the cutting surface of the cutter 3 an electric discharge 5 is produced.

The output voltage of the electrodischarge sensor is in a linear dependence on the value of the electrodischarge clearance of the electric discharge 5 and is used as a control signal for the duplicating system of the machine-tool.

If the electrodischarge clearance is less than the predetermined nominal value, in accordance with a signal from the sensor, the drive of the actuating members of the machine starts operating so that the clearance is increased to a nominal value. If the cutter 3 is removed from the contour of the pattern 1 being duplicated by a distance greater than the predetermined value, the drive displaces the actuating members of the machine, according to the signal from the sensor, so as to reduce the electrodischarge clearance to a nominal value.

Thus, the rotating cutter 3 follows the pattern 1 over its entire contour being duplicated and is spaced from it by a distance close to a predetermined nominal value. As this takes place, the workpiece 2 is milled.

What is claimed is:

1. A method of milling workpieces to patterns which comprises rigidly binding together a workpiece and a pattern made from a conductive material, placing the workpiece and pattern with respect to each other so that the contour projection of said pattern being duplicated on a profiling plane is equi-distant to the contour to be machined by a cutter on said workpiece, positioning a cutter so that its cutting surface is closely located to said pattern, creating an electric discharge between said cutter and said pattern, and moving said cutter along the entire contour of said pattern, said cutter and said workpiece being moved relatively to each other depending on the value of said electric discharge maintained between said cutter and said pattern.

2. The method of claim 1 wherein said workpiece is made from a conductive material and wherein said pattern is electrically insulated from said workpiece.

3. The method of claim 1 wherein said workpiece is made from a nonconductive material.

* * * * *